US005943766A

United States Patent [19]

Beane

[11] Patent Number: 5,943,766

[45] Date of Patent: Aug. 31, 1999

[54] MACHINE FOR INSERTING STRINGERS INTO PALLETS

[75] Inventor: Timothy R. Beane, Grafton, Ohio

[73] Assignee: Pallet Recycling, Inc., Barberton, Ohio

[21] Appl. No.: 09/080,830

[22] Filed: May 18, 1998

[51] Int. Cl.[6] ...................................................... B23P 21/00

[52] U.S. Cl. ............................................ 29/772; 29/402.08

[58] Field of Search ......................... 29/700, 798, 402.08, 29/822, 772; 493/964

[56] References Cited

U.S. PATENT DOCUMENTS

| | | | |
|---|---|---|---|
| 3,846,890 | 11/1974 | Bielkiewicz . | |
| 4,089,107 | 5/1978 | Sanford . | |
| 4,295,269 | 10/1981 | Wright | 29/798 |
| 4,750,255 | 6/1988 | Hufnagel . | |
| 4,764,074 | 8/1988 | Postigo . | |
| 5,020,966 | 6/1991 | Kiker . | |

*Primary Examiner*—S. Thomas Hughes
*Assistant Examiner*—Steven A Blount
*Attorney, Agent, or Firm*—Rankin, Hill, Porter & Clark LLP

[57] ABSTRACT

A machine for inserting stringers into pallets includes a table assembly that establishes a horizontal working surface upon which a pallet can be placed and clamped in position. A carrier assembly that is movable in a generally horizontal plane includes an elongate trough into which a stringer can be placed. The trough carries a movable clamping rail that is adapted to clamp a stringer in the trough. The trough also carries a movable spreader bar that is adapted to spread deckboards a distance adequate to receive a stringer. The machine includes a hydraulic cylinder for reciprocating the carrier assembly toward and away from a pallet disposed on the working surface. The machine also includes a movable clamp that prevents a pallet from moving on the working surface. After a stringer has been inserted into a pallet, the spreader bar is lowered and the stringer is nailed in place. The carrier assembly then is retracted in preparation for another stringer insertion operation.

14 Claims, 3 Drawing Sheets

MACHINE FOR INSERTING STRINGERS INTO PALLETS

BACKGROUND OF THE INVENTION

1. Field of the Invention

The invention relates to the repair of pallets and, more particularly, to techniques for inserting new stringers into pallets.

2. Reference to Related Patent

Reference is hereby made to U.S. application Ser. No. 09/080,790, filed concurrently by Timothy R. Beane, currently pending, entitled Machine for Removing Stringers from Pallets (hereinafter "the Stringer Removal Patent"), the disclosure of which is incorporated herein by reference.

3. Description of the Prior Art

Load-bearing pallets fabricated of wooden components frequently are used to transport and store various articles, machines, or materials. Such pallets generally are of two types: the stringer type and the block type. Stringer-type pallets include three spaced, parallel support members to which upper and lower deckboards are nailed. Block-type pallets employ a number of relatively small, spaced blocks to which upper and lower deckboards are nailed. The spaces between the stringers or the blocks are adapted to receive the tines of conventional forklift trucks.

In the course of being moved from place to place, the pallets frequently become damaged. If a damaged pallet is not repaired, it must be discarded because of its inability to safely and securely support and transport articles or materials. Because a new pallet is expensive, it is desirable to repair damaged pallets rather than to buy new ones, if possible.

Due to the large number of pallets that must be repaired, it is important that high quality pallet repairs be done quickly and inexpensively. Unfortunately, pallet repairs usually are done by hand. That is, damaged pallets must be partially or totally disassembled with crowbars or similar manual tools and reassembled with new components. In the particular case of repairing damaged stringers, the deckboards must be removed or at least separated from the stringers in order to permit any nails that interconnect the deckboards and stringers to be removed or sheared. Thereafter, new stringers must be inserted into the spaces vacated by the removed stringers and nailed in place.

Although tools are available that attempt to improve the stringer insertion process, such tools suffer from a variety of drawbacks. A significant drawback is that prior tools do not effectively spread the deckboards in order to permit rapid and accurate insertion of a new stringer. Typically, two or more workers will manually spread the deckboards. This technique is very inefficient.

Desirably, a stringer insertion machine would be available that would enable pallet repairs to be accomplished with a minimum of manual labor and with an increase in processing speed. Such a machine hopefully would be sufficiently reliable that part replacement or repairs would be avoided substantially.

SUMMARY OF THE INVENTION

In response to the foregoing concerns, the present invention provides a new and improved machine for inserting stringers into pallets. The machine according to the invention includes a table assembly that establishes a working surface upon which a pallet can be placed. A carrier assembly is spaced from the working surface and is movable relative to the pallet. Preferably, the working surface lies in a horizontal plane. It is preferred that the working surface be defined by a plurality of powered rollers.

The carrier assembly includes a trough into which a stringer can be inserted. One of the sides of the trough carries a clamping rail that can be moved selectively into engagement with the stringer to clamp the stringer in place within the trough. The carrier assembly also includes a selectively movable spreader bar. The spreader bar can be moved from a retracted position where it is approximately level with the side of the trough to an extended position where it is raised above the level of the trough.

In the preferred embodiment, the machine includes means for reciprocating the carrier assembly toward and away from a pallet disposed on the working surface. The table assembly includes a backstop against which the pallet is placed. The pallet is disposed so that the remaining stringers are parallel with the trough and the space for the missing stringer is aligned with the trough. The machine includes a movable pallet clamp that can be moved from an extended position where the pallet is tightly held against the backstop to a retracted position where the pallet is free to move.

After a stringer is placed in the trough, the clamping rail is actuated to clamp the stringer in place. Also, the pallet clamp is moved to the extended position to hold the pallet in place. At the same time, the spreader bar is raised. Thereafter, the carrier assembly is advanced into the pallet. The spreader bar spreads the deckboards to enable the stringer to be inserted into the pallet without restriction. After the spreader bar and the clamping rail have been retracted, the stringer is nailed in place and the carrier assembly is withdrawn from the pallet. The pallet clamp is moved to the retracted position to release the pallet. Then, the powered rollers are actuated to withdraw the repaired pallet and replace it with another one to be repaired.

By use of the present invention, stringer insertion can be accomplished exceedingly efficiently, with minimal manual labor. The rollers enable a pallet to be positioned easily on the working surface, and the carrier assembly automatically spreads the deckboards for proper insertion of a new stringer. It has been found that stringers can be inserted quickly and accurately by only one operator. The repaired pallet can be moved from the table assembly and another pallet can be positioned in its place in a matter of seconds.

The foregoing and other features and advantages of the invention will be apparent from reviewing the following description and claims, taken in conjunction with the accompanying drawings.

DESCRIPTION OF THE PREFERRED EMBODIMENT

Figures 1, 2:
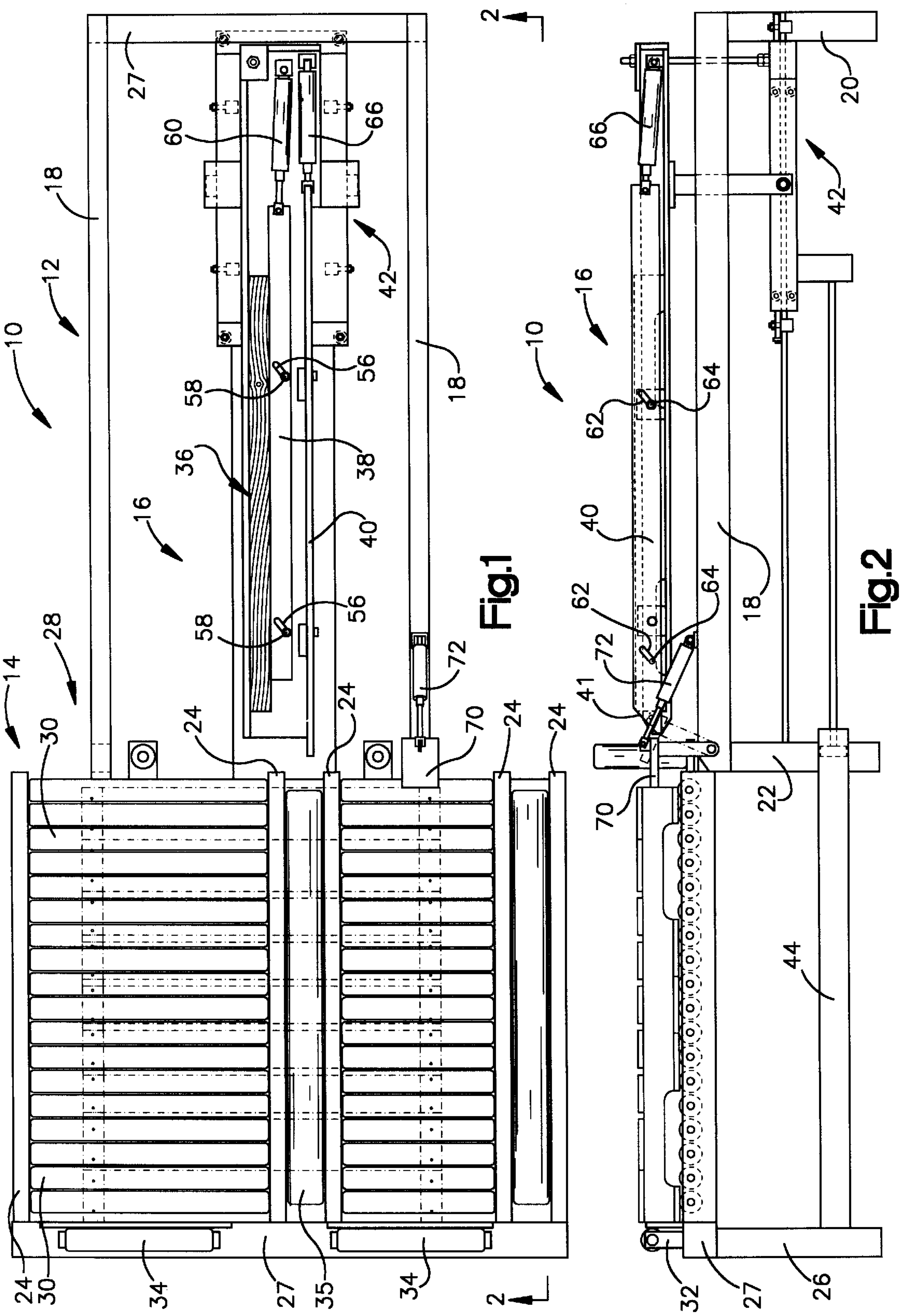
FIG. 1 is a top plan view of a machine according to the invention showing a stringer-containing carrier assembly about to be inserted into a pallet.
FIG. 2 is a side elevational view of the machine of FIG. 1.

Referring to the various Figures, a machine for inserting stringers into pallets is indicated generally by the reference numeral 10. The machine 10 includes a frame 12, a table assembly 14, and a carrier assembly 16.

The frame 12 includes parallel, spaced rails 18 that are connected to posts 20, 22. The table assembly 14 includes parallel, spaced rails 24 that are connected to the posts 22 and to posts 26. Cross-braces 27 connect the various posts 20, 22, 26.

The table assembly 14 establishes a working surface 28 upon which a pallet can be placed. The working surface 28 is defined by a plurality of rollers 30 that rotate about axes that are generally perpendicular with the path of travel of the carrier assembly 16. The table assembly 14 includes spaced uprights 32 having rollers 34 at the top. The uprights 32 and the rollers 34 act as a backstop to prevent pallet movement during a stringer insertion operation. The table assembly 14 also includes a pair of spaced, powered rollers 35 that normally are retracted (FIGS. 6 and 7), but which can be raised to remove a pallet from the working surface 28 in a direction parallel to the axes of rotation of the rollers 30.

The carrier assembly 16 is spaced from the working surface 28 and includes-an elongate trough 36 into which a stringer may be placed. The carrier assembly 16 includes a clamping rail 38 that is selectively movable toward a stringer disposed in the trough 36 in order to clamp the stringer in the trough 36. The carrier assembly 16 also includes a spreader bar 40 having a beveled leading edge 41. The spreader bar 40 is movable between a retracted position where the spreader bar 40 is approximately the same level as the trough 36 and an extended position where the spreader bar 40 is raised above the trough 36.

The carrier assembly includes a carriage 42 that supports the trough 36, the clamping rail 38, and the spreader bar 40 for reciprocating movement toward and away from the table assembly 14. The carriage 42 is substantially identical to the carriage disclosed in the Stringer Removal Patent, except that the carrier assembly 16 is pivoted at the bottom rear of the carriage, rather than at the upper rear of the carriage. As in the Stringer Removal Patent, the carriage 42 moves back and forth on a stationary beam and includes threaded rods that enable the position of the carrier assembly 16 to be adjusted relative to a pallet positioned on the working surface 28. As in the Stringer Removal Patent, the present invention includes a hydraulic cylinder 44 connected between the frame 12 and the carriage 42. The hydraulic cylinder 44 is oriented such that it moves back and forth parallel to the path of travel of the carriage 42.

Figure 6:
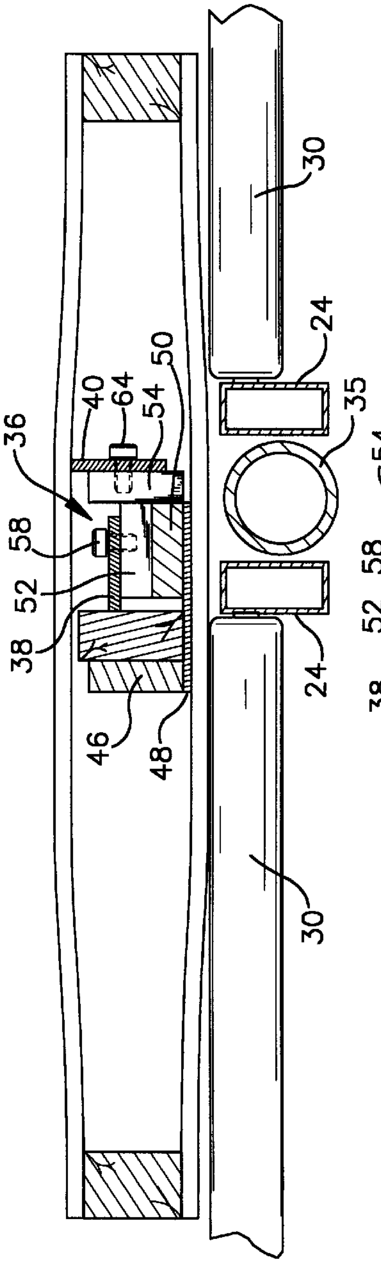
FIG. 6 is a cross-sectional view of the machine according to the invention taken along a plane indicated by line 6—6 in FIG. 4.
Figure 7:
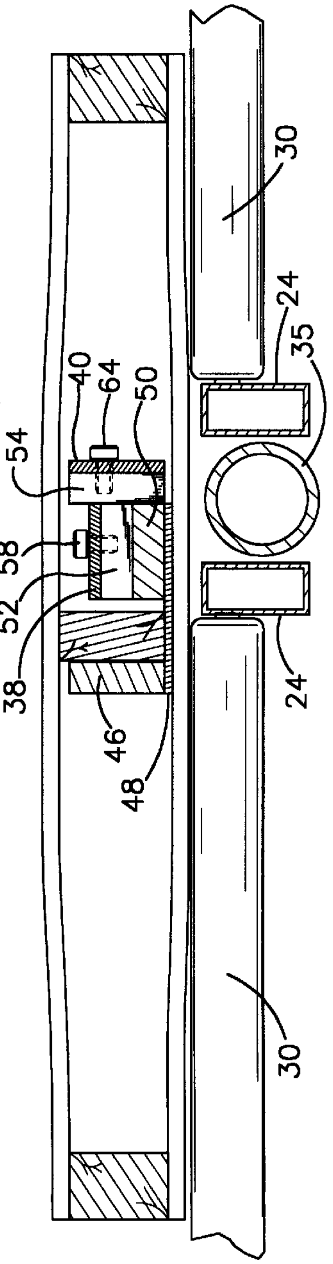
FIG. 7 is a cross-sectional view of the machine according to the invention taken along a plane indicated by line 7—7 in FIG. 5.

Referring particularly to FIGS. 6 and 7, the trough 36 is defined by a side rail 46, a trough plate 48, and a horizontal rail 50. A first mounting block 52 is secured to the horizontal rail, and a second mounting block 54 is secured to the first mounting block 52. Together, the side rail 46, the trough plate 48, and the horizontal rail 50 form a U-shape when viewed from the end as in FIGS. 6 and 7.

The clamping rail 38 has a longitudinal axis and is disposed parallel with the trough 36 atop the first mounting blocks 52. The clamping rail 38 includes a pair of slots 56 extending therethrough. The slots 56 are disposed at a 45 degree angle relative to the longitudinal axis of the clamping rail 38. A pair of bolts 58 extend through the slots 56 and into the mounting blocks 52. A hydraulic cylinder 60 is connected to the clamping rail 38 at that end of the clamping rail 38 remote from the working surface 28. The hydraulic cylinder 60 is oriented such that upon actuation of the cylinder 60, the clamping rail 38 will be moved back and forth parallel to the trough 36.

The spreader bar 40 is constructed and mounted similarly to the clamping rail 38. The spreader bar 40 includes a longitudinal axis and is disposed parallel with the trough 36 along the side of the second mounting blocks 54. The spreader bar 40 includes a pair of slots 62 extending therethrough. The slots 62 are disposed at a 45 degree angle relative to the longitudinal axis of the spreader bar 40. A pair of bolts 64 extend through the slots 62 and into the mounting blocks 54. A hydraulic cylinder 66 is connected to the spreader bar 40 at that end of the spreader bar 40 remote from the working surface 28. The hydraulic cylinder 66 is oriented such that upon actuation of the cylinder 66, the spreader bar 40 is moved back and forth parallel to the trough 36.

Figure 3:
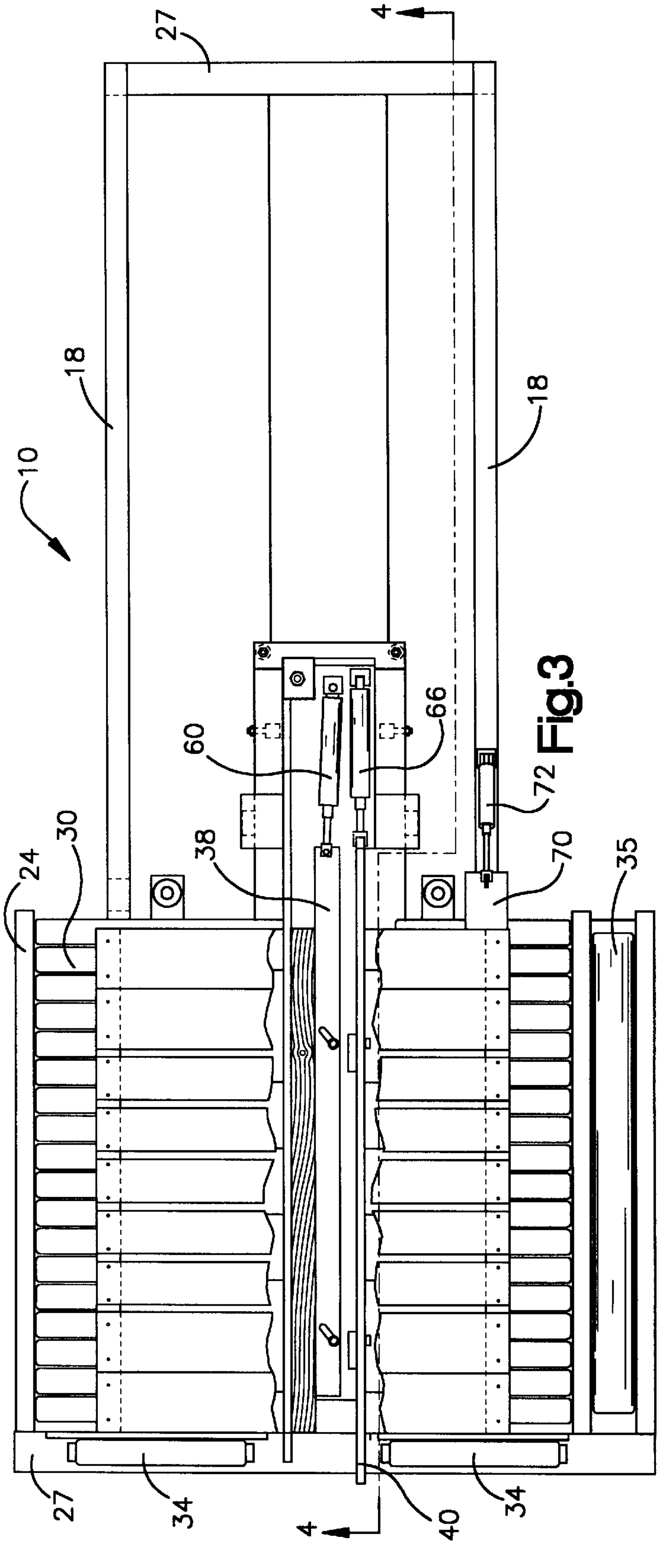
FIG. 3 is a view similar to FIG. 1 showing the carrier assembly after it has been inserted into the pallet.
Figure 4:
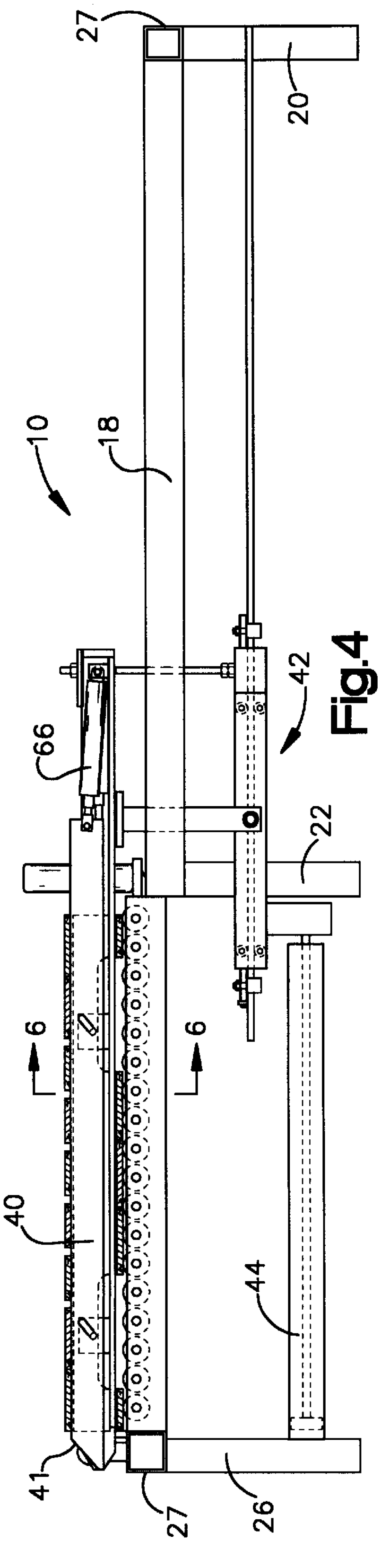
FIG. 4 is a side elevational view of the machine of FIG. 3.
Figure 5:
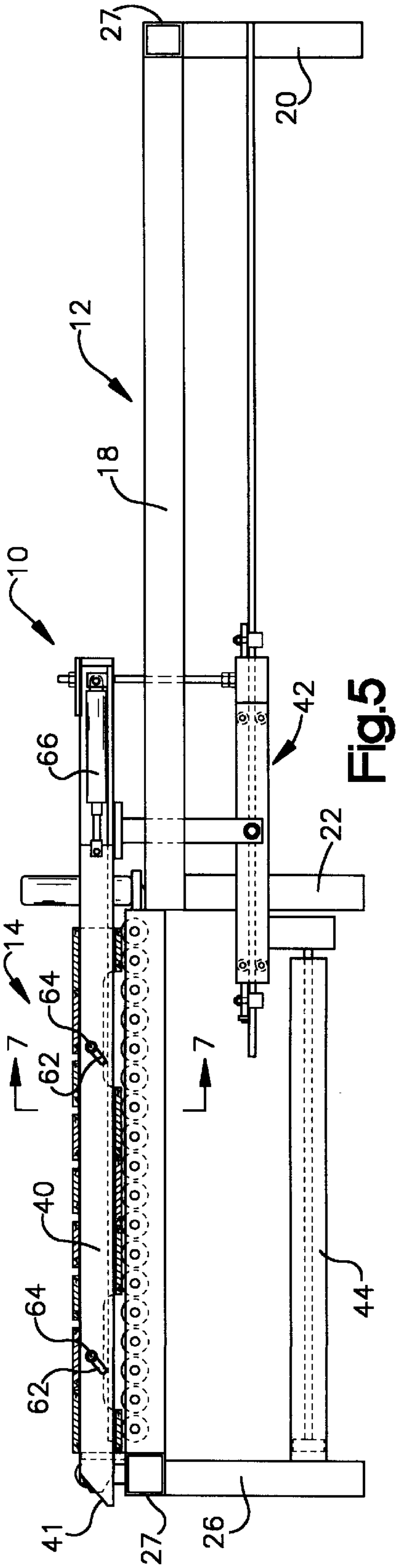
FIG. 5 is a view similar to FIG. 4 with the carrier assembly about to be withdrawn from the pallet.

Referring particularly to FIGS. 1–3, a clamp 70 is pivotally connected to one of the spaced rails 18 adjacent the working surface 28. A hydraulic cylinder 72 is connected between the clamp 70 and the rail 18. As will be apparent from an examination of FIGS. 1 and 2, when the hydraulic 72 is retracted, the clamp 70 will be moved away from the uprights 32 and the rollers 34. Conversely, when the hydraulic cylinder 72 is actuated, the clamp 70 will be moved toward the uprights 32 and the rollers 34, thereby compressing a pallet in place on the working surface 28.

In operation, a pallet is positioned on the working surface 28 by moving it over the rollers 34 onto the rollers 30. In moving the pallet in this manner, it is expected that a stringer removal machine similar to that disclosed in the Stringer Removal Patent will be positioned immediately adjacent to the machine 10 at right angles thereto. Accordingly, immediately after a stringer has been removed from a pallet, the pallet can be moved directly from the stringer removal machine onto the working surface 28. After the pallet is in place on the working surface 28, a new stringer is loaded into the trough 36. Upon pressing a start button, the clamp 70 is closed, the clamping rail 38 is closed to compress the stringer in place within the trough 36, and the spreader bar 40 is raised. These three actions occur substantially simultaneously.

The hydraulic cylinder 44 is actuated so as to move the carriage 42 toward the pallet. The stringer is inserted into the spaces between the deckboards aided by the raised spreader bar 40 with its beveled leading edge 41. After the carrier assembly 16 has been fully inserted into the pallet, the cylinder 66 is actuated in order to retract the spreader bar 40. Thereafter, the operator nails the stringer into place. After the operator presses a “retract” button, the cylinder 60 is actuated in order to retract the clamping bar 38. Then, the carrier assembly 16 is withdrawn from the pallet. Shortly afterwards, the cylinder 72 is actuated to retract the clamp 70 and the rollers 35 are raised, thereby lifting the pallet from the rollers 30. Upon activation of the rollers 35, the pallet will be removed from the working surface 28.

As will be apparent from the foregoing description, the present invention enables stringer insertion to be accomplished exceedingly efficiently, with minimal manual labor. The rollers 30, 34 enable a pallet to be positioned easily on the working surface 28, and the carrier assembly 16 automatically spreads the deckboards for proper insertion of a new stringer. It has been found that stringers can be inserted quickly and accurately by only one operator. The repaired pallet can be moved from the table assembly and another pallet can be positioned in its place in a matter of seconds.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A machine for inserting stringers into pallets, each pallet having spaced parallel stringers, upper and lower deckboards secured to the stringers, the deckboards being disposed perpendicular to the stringers and defining open-ended spaces between the stringers, the machine comprising:

a table assembly that establishes a working surface upon which a pallet can be placed;

a carrier assembly spaced from the working surface, the carrier assembly including:

an elongate trough into which a stringer may be placed;

a clamping rail selectively movable toward the stringer in order to clamp a stringer in the trough; and a spreader bar, the spreader bar being movable between a retracted position where the spreader bar is at approximately the same level as the trough and an extended position where the spreader bar is raised above the trough; and means for moving the carrier assembly and the pallet toward and away from each other.

2. The machine of claim 1, wherein the working surface is horizontal.

3. The machine of claim 1, wherein the table assembly further includes a plurality of powered rollers that define the working surface, the rollers rotating about axes that are generally parallel with the path of travel of the carrier assembly.

4. The machine of claim 1, wherein the trough is defined by three elongate rails joined at their edges to form a U-shape when viewed from the end.

5. The machine of claim 4, further comprising mounting blocks secured to a selected side of the trough, and wherein the clamping rail and the spreader bar are connected to, and supported by, the mounting blocks.

6. The machine of claim 5, wherein:

the clamping rail has a longitudinal axis and is disposed parallel with the trough and atop the mounting blocks, the clamping rail including a pair of slots extending therethrough, the slots being disposed at an angle relative to the longitudinal axis of the clamping rail;

a pair of bolts extend through the slots and into the mounting blocks; and a hydraulic cylinder is connected to the clamping rail at that end of the clamping rail remote from the working surface, the hydraulic cylinder being oriented such that upon actuation of the hydraulic cylinder the clamping rail is moved back and forth parallel to the trough.

7. The machine of claim 6, wherein the slots are disposed at an angle of approximately 45 degrees relative to the longitudinal axis.

8. The machine of claim 5, wherein:

the spreader bar has a longitudinal axis and is disposed parallel with the trough and along the side of the mounting blocks, the spreader bar including a pair of slots extending therethrough, the slots being disposed at an angle relative to the longitudinal axis of the spreader bar;

a pair of bolts extend through the slots and into the mounting blocks; and a hydraulic cylinder is connected to the spreader bar at that end of the spreader bar remote from the working surface, the hydraulic cylinder being oriented such that upon actuation of the hydraulic cylinder the spreader bar is moved back and forth parallel to the trough.

9. The machine of claim 8, wherein the slots are disposed at an angle of approximately 45 degrees relative to the longitudinal axis.

10. The machine of claim 1, wherein the carrier assembly is movable and the pallet is stationary during a stringer insertion operation, the machine further comprising a frame to which the carrier assembly is mounted for back and forth movement relative to the pallet, and wherein the means for moving the carrier assembly is a hydraulic cylinder connected between the frame and the carrier assembly, the hydraulic cylinder being disposed parallel to the path of travel of the carrier assembly.

11. The machine of claim 1, wherein the machine includes a frame to which the carrier assembly is mounted, the carrier assembly including a carriage having spaced side plates, an elongate rail secured to the frame, and supporting rollers included as part of the side plates, the supporting rollers being in contact with the rail for movement therealong.

12. The machine of claim 11, further comprising means to adjust the position of the carrier assembly relative to the working surface, said means including:

a pair of uprights connected to the carriage;

the trough, clamping rail and stabilizer rail being connected to the uprights toward the upper end thereof, the uprights being connected to the frame by a pivotal connection toward the lower end thereof; and an adjustable support for the rear of the carrier assembly, the adjustable support being in the form of threaded rods interconnecting the carriage and the trough at that end of the trough remote from the working surface.

13. The machine of claim 1, further comprising:

a frame to which the working surface is connected;

a backstop included as part of the frame against which a pallet is compressed in use;

a clamp pivotally connected to the frame at a location away from the backstop, the clamp being movable from a retracted position to an extended position, the clamp in the extended position contacting a pallet and pushing it against the backstop.

14. The machine of claim 13, further comprising a hydraulic cylinder connected between the clamp and the frame, the cylinder causing the clamp to be moved between the retracted and the extended positions.

* * * * *